Feb. 14, 1967     L. R. HARRIS     3,303,821

MECHANICAL CUTTING CALF

Filed Sept. 24, 1965     4 Sheets-Sheet 1

INVENTOR.
LEE R. HARRIS,
BY
Berman, Davidson & Berman
ATTORNEYS.

Feb. 14, 1967  L. R. HARRIS  3,303,821
MECHANICAL CUTTING CALF
Filed Sept. 24, 1965  4 Sheets-Sheet 2
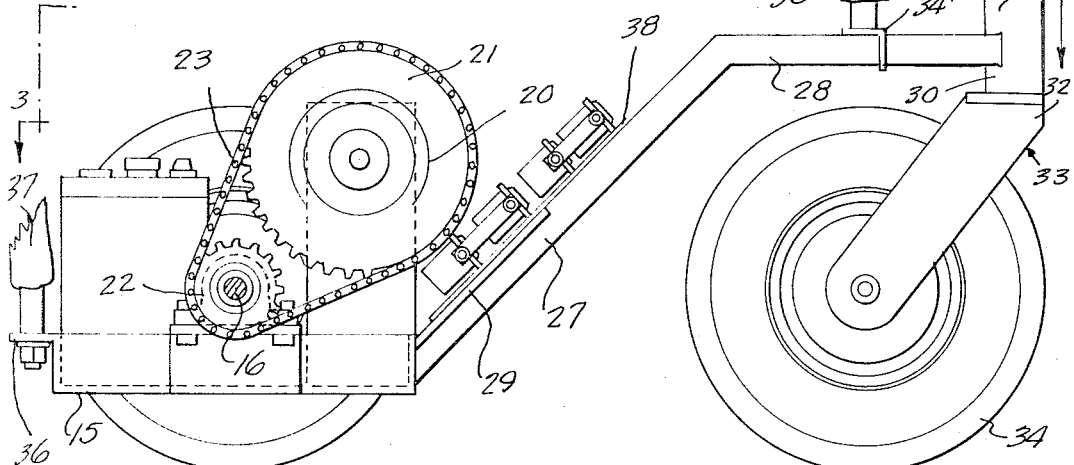
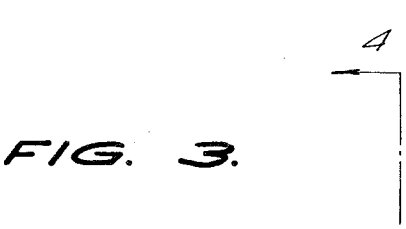
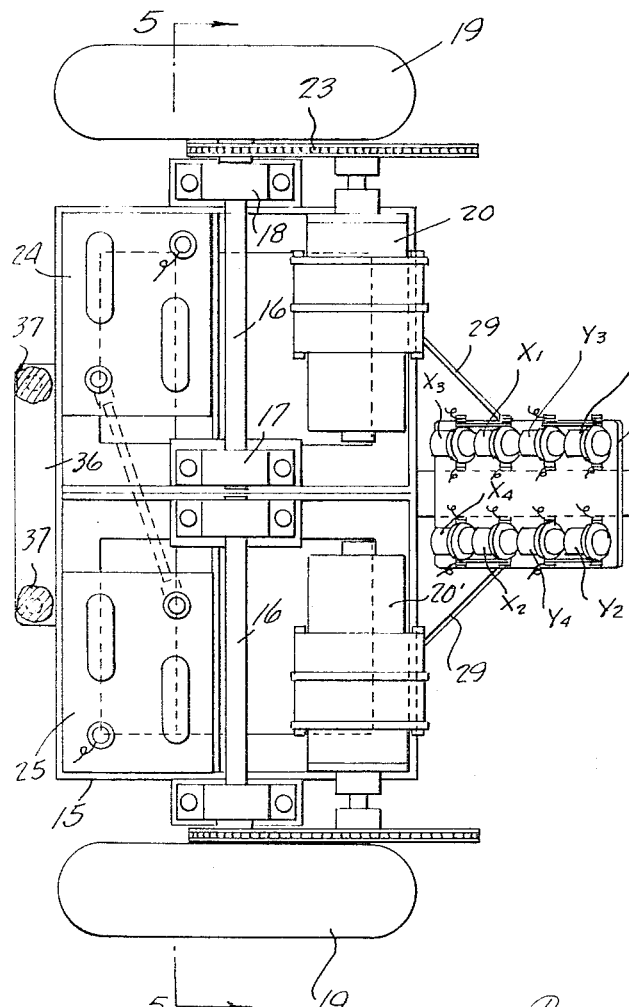
INVENTOR.
LEE R. HARRIS,
BY
Berman, Davidson & Berman
ATTORNEYS.

Feb. 14, 1967 L. R. HARRIS 3,303,821
MECHANICAL CUTTING CALF
Filed Sept. 24, 1965 4 Sheets-Sheet 3

INVENTOR.
LEE R. HARRIS,
BY
Berman, Davidson & Berman
ATTORNEYS.

Feb. 14, 1967  L. R. HARRIS  3,303,821
MECHANICAL CUTTING CALF
Filed Sept. 24, 1965  4 Sheets-Sheet 4

INVENTOR.
LEE R. HARRIS,
BY
Berman, Davidson & Berman
ATTORNEYS.

United States Patent Office 3,303,821
Patented Feb. 14, 1967

3,303,821
MECHANICAL CUTTING CALF
Lee R. Harris, 3307 Larry Lane, Austin, Tex. 78722
Filed Sept. 24, 1965, Ser. No. 489,909
10 Claims. (Cl. 119—29)

This invention relates to animal training devices, and more particularly to a mechanical simulated calf for use in training horses which will be ultimately employed in cattle herding operations.

A main object of the invention is to provide a novel and improved mechanical calf to be employed for training horses in herding operations, namely, in cutting out calves, the mechanical calf being relatively simple in construction, being remotely controlled by a radio link so that it can be caused to perform various maneuvers, and being arranged so that it can be caused to move in various different patterns typical of live calves.

A further object of the invention is to provide an improved mechanical calf which may be employed in training horses in herding operations, the mechanical calf being durable in construction, being reliable in operation, and eliminating the necessity of maintaining live calves on hand for this purpose, thus eliminating the necessity of feeding calves during their use for training horses for this purpose and thereby considerably reducing the cost of training the horses.

A still further object of the invention is to provide an improved radio-controlled mechanical calf for use in training horses for herding operations, the mechanical calf device being provided with means for controlling its movement by radio, being arranged so that its pattern of movement may be accurately controlled, and having an appearance closely simulating that of an actual calf so that it is highly effective in conditioning a horse to the movements of actual calves during herding operations.

Further objects and advantages of the invention will become apparent from the following description and claims, and from the accompanying drawings, wherein:

FIGURE 2 is a fragmentary side elevational view of the mechanical calf illustrated in FIGURE 1, showing the supporting structure for the simulated calf body.

FIGURE 3 is a horizontal cross sectional view taken substantially on the line 3—3 of FIGURE 2.

Figure 1:
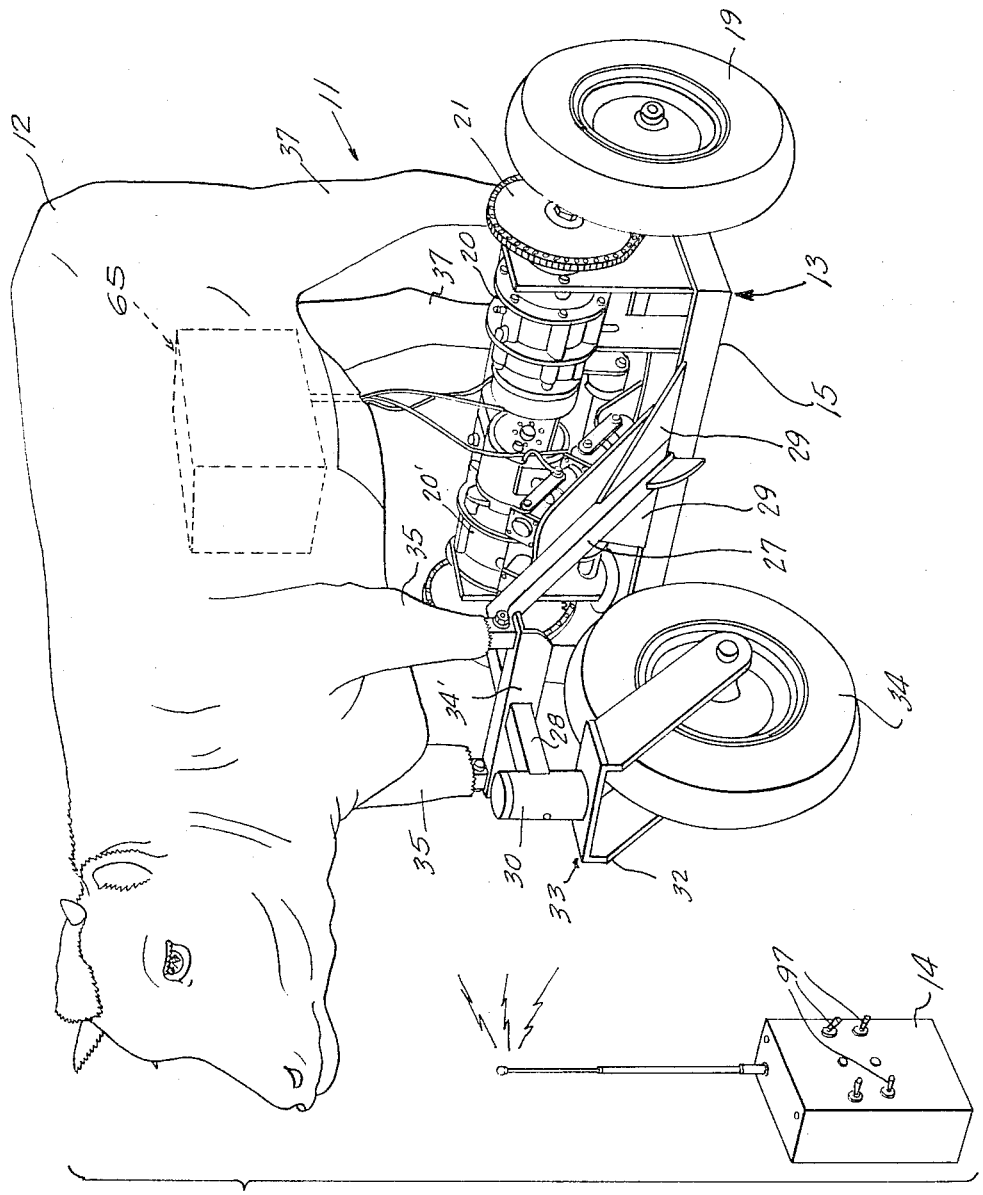
FIGURE 1 is a perspective view of an improved mechanical calf constructed in accordance with the present invention, shown together with a control transmitter in conjunction with which it is employed.
Figure 4:
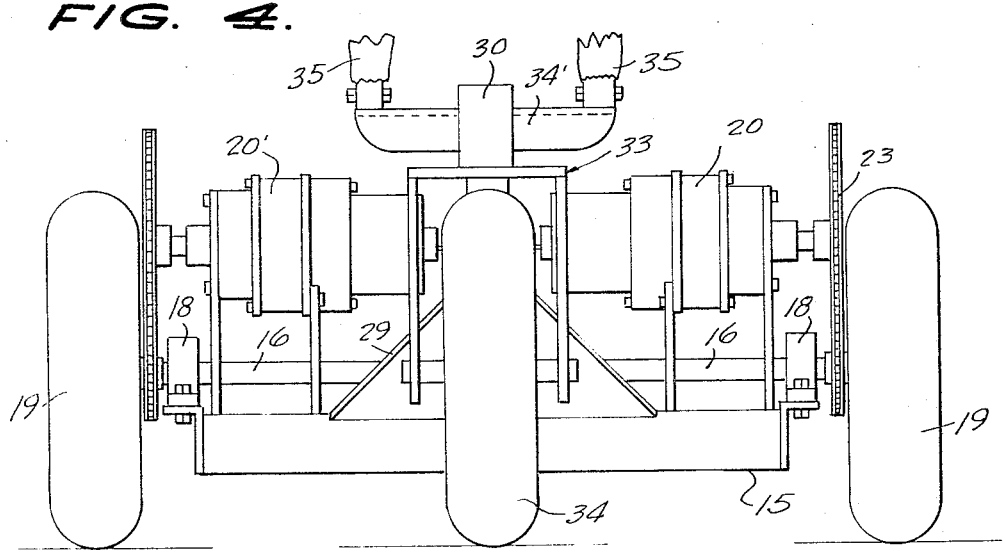
FIGURE 4 is an elevational view taken substantially on the line 4—4 of FIGURE 3.
Figure 5:
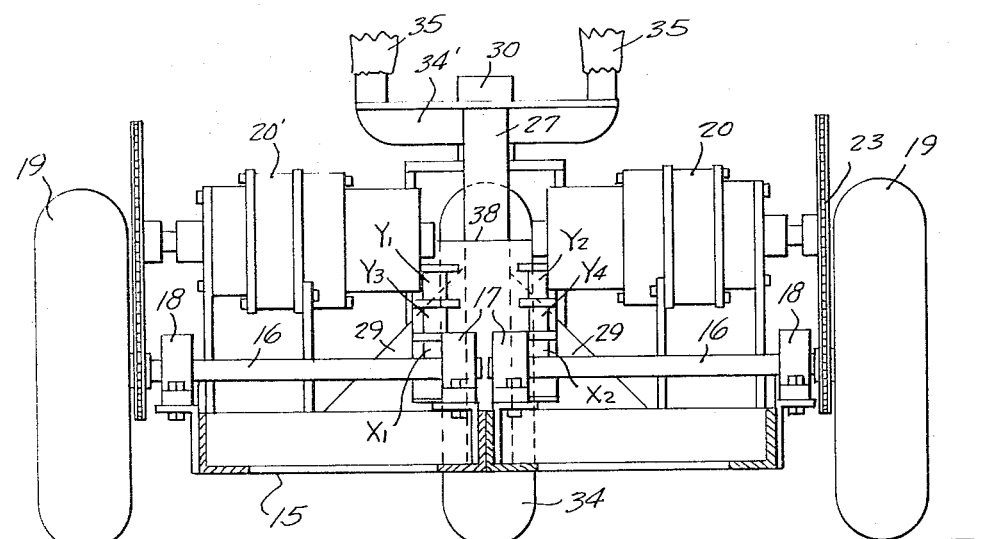
FIGURE 5 is a transverse vertical cross sectional view taken substantially on the line 5—5 of FIGURE 3.

Referring to the drawings, 11 generally designates an improved mechanical calf for use in training horses for herding operations, constructed in accordance with the present invention. The mechanical calf 11 comprises a life-size simulated calf body 12 which is secured to and supported on a wheeled frame, designated generally at 13, the frame being provided with driving mechanism, presently to be described, for setting up and controlling various patterns of movement of the mechanical calf 11 in accordance with control signals emitted from a remote radio transmitter 14. The supporting vehicle 13 comprises a generally rectangular transversely extending rear frame 15 on the opposite side portions of which are journaled respective axles 16, 16, said axles being transversely aligned and being rotatably supported in respective pairs of bearing assemblies 17, 18. Mounted on the outer end of each axle 16 is a driving wheel 19, each wheel being driven by an electric motor 20 or 20' mounted on a forward corner portion of the frame, as shown in FIGURE 3, and drivingly coupled to the wheel. Thus, a large driving sprocket 21 is secured on each motor shaft and the sprocket 21 is drivingly coupled to a smaller sprocket 22 secured on the rear axle by a sprocket chain 23, as shown in FIGURE 2. The motors 20 and 20' are of the reversible direct current type and are adapted to be energized by current supplied by a pair of series-connected six volt storage batteries 24, 25, said storage batteries being respectively mounted on the rear corner portions of the frame 15 and being suitably secured thereon.

Rigidly secured to the intermediate portion of the front transverse bar element of frame 15 and extending upwardly and forwardly therefrom is a frame bar 27 which is integrally formed at its top end with the horizontally extending forwardly projecting front end portion 28. The frame bar 27 is braced to the rear frame portion 15 by triangular gusset plates 29, 29. Rigidly secured to the front end of the horizontal forward bar member 27 is a vertical bearing 30 which rotatably receives the vertical shaft 31 of the yoke 32 of a dolly assembly shown generally at 33. Journaled between the arms of the yoke 32 is the front dolly wheel 34 which is free to turn around the vertical axis of shaft 31.

Rigidly secured to the intermediate portion of the horizontal front bar member 27 is a transversely extending supporting angle bar 34', and supportingly secured on the end portions of the bar 34' are the respective front legs 35, 35 of the simulated calf body 12.

The frame 15 is provided at its rear end with the horizontal flange 36, and supportingly secured on the end portions of the flange 36 are the respective rear legs 37, 37 of the simulated calf body 12, as shown in FIGURE 3.

Figure 6:
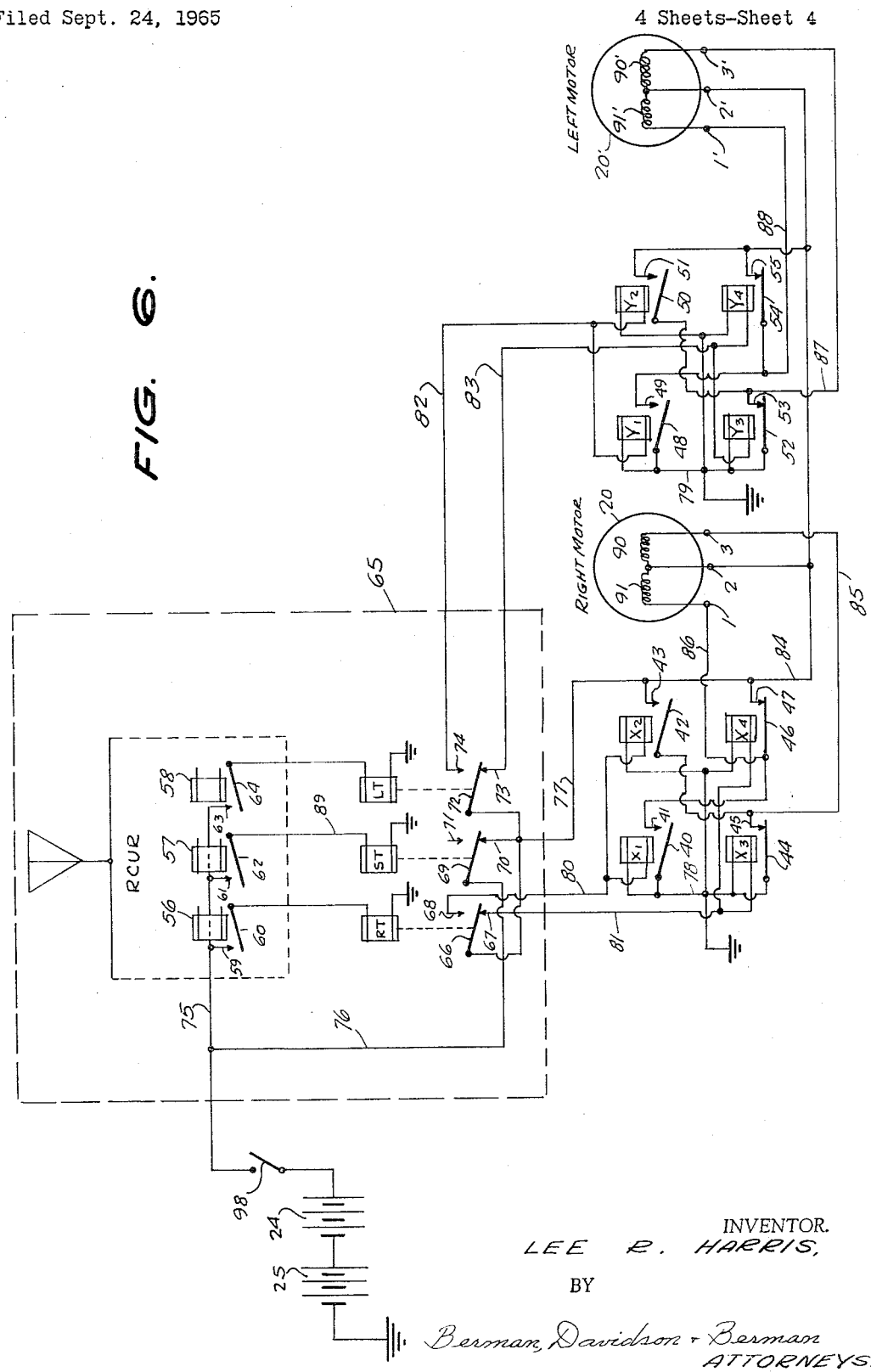
FIGURE 6 is a wiring diagram showing a typical electrical circuit for a mechanical calf in accordance with the present invention.

Rigidly secured on the upwardly and forwardly inclined frame bar element 27 is a generally rectangular supporting plate 38 on which are mounted eight motor control solenoids associated with the wheel driving motors 20, 20', the solenoids comprising two groups of four each, shown respectively at X1, X2, X3 and X4 and Y1, Y2, Y3 and Y4. The solenoids X1, X2, X3 and X4 are provided with the normally open pairs of switch contacts 40 and 41, 42 and 43, 44 and 45, and 46 and 47. The solenoids Y1, Y2, Y3 and Y4 are provided with the respective pairs of normally open switch contacts 48 and 49, 50 and 51, 52 and 53, and 54 and 55, as shown in FIGURE 6. The contacts are open when the solenoids are deenergized but are closed when the solenoids are energized, and FIGURE 6 shows the solenoids X3, X4, Y3 and Y4 in their energized positions.

Mounted in the simulated calf body 12 is a radio transmitter of conventional construction, which may be similar to the radio transmitter described in U.S. Patent No. 2,866,253 to J. M. Lovell, namely, being of a type provided with relays 56, 57 and 58 which respond to different modulation frequencies applied to the carrier received by the receiver, the relays being provided with the respective normally open pairs of contacts 59 and 60, 61 and 62 and 63 and 64, shown in FIGURE 6. The radio receiver, designated generally at 65 is mounted in the simulated calf body 12, as above mentioned, and is further provided with the respective single-pole, double-throw relays RT, ST, and LT, illustrated in FIGURE 6, for controlling the energization of the solenoids associated with the respective motors 20 and 20'.

The relay RT is provided with the armature 66 which normally engages a lower contact 67 which is elevated to engage its upper contact 68 responsive to the energization of the relay RT.

The relay ST is provided with the armature 69 which normally engages its lower contact 70 but which is elevated to disengage from said lower contact and to engage its open upper contact 71 responsive to the energization of the relay ST.

The relay LT is provided with the armature 72 which normally engages its lower contact 73 and which is elevated to engage its upper contact 74 responsive to the energization of the relay LT.

As will be seen from FIGURE 6, the contacts 59, 61 and 63 are connected to the common wire 75 which is connected to the positive terminal of the series-connected batteries 24, 25. The negative terminal of said batteries is connected to ground. A wire 76 connects wire 75 to armature 69. Contact 70 is connected to a wire 77 which is also connected to the armatures 66 and 72. The windings of the motor 20 have the respective terminals 1, 2 and 3, and the windings of the motors 20' have the respective terminals 1', 2', and 3'. The wire 77 is connected to the motor terminals 2 and 2' and is also connected to the solenoid contacts 43 and 47.

The armatures 40 and 44 of solenoids X1 and X3 are connected to ground by a common wire 78. One terminal of each of the windings of the solenoids X1, X2, X3 and X4 is connected to the grounded wire 78. Similarly, the armatures 48 and 52 of the solenoids Y1 and Y3 are connected to a grounded wire 79 and one terminal of each of the solenoids Y1, Y2, Y3 and Y4 is connected to said grounded wire 79.

The ungrounded terminals of the relays X1 and X2 are connected by a common wire 80 to the upper relay contact 68 associated with the relay RT. The ungrounded terminals of the solenoids X3, X4 are connected by a common wire 81 to the lower relay contact 67 of relay RT. Similarly, the ungrounded terminals of solenoids Y1, Y2 are connected by a wire 82 to the upper contact 74 of relay LT, and the ungrounded terminals of the solenoids Y3, Y4 are connected by a wire 83 to the lower contact 73 of relay LT.

Relay contacts 43 and 47 are connected by a common wire 84 to the wire 77 and armature 42 and contact 45 are connected by a common wire 85 to the terminal 3 of motor 20. Armature 46 and contact 41 are connected by a common wire 86 to the terminal 1 of motor 20. Armature 50 and contact 53 are connected by a terminal wire 87 to the terminal 3' of motor 20', and armature 54 and contact 49 are connected by a common wire 88 to the terminal 1' of motor 20'.

Normally, before the mechanical calf begins movement, the transmitter 14 furnishes a signal which is modulated with the tone which is effective to maintain the relay 57 of the receiver energized. The armature 62 of relay 57 is connected through a wire 89 and the winding of the relay ST to ground, so that the energization of relay 57 energizes the relay ST and holds the armature 69 disengaged from the contact 70. When the holding signal from the transmitter 14 is discontinued, namely, the above mentioned tone is omitted from the carrier, relay 57 becomes deenergized, causing relay ST to become deenergized and causing the armature 69 to engage the contact 70, as illustrated in FIGURE 6. This energizes the winding 90 of the rigid motor 20 and the winding 90' of the left motor 20' to produce forward movement of the mechanical calf. The motor winding 90 is energized by a circuit comprising battery wire 75, wire 76, armature 69, contact 70, wire 77, wire 84, motor terminal 2, the winding 90, motor terminal 3, wire 85, solenoid contact 45, armature 44 and ground. Similarly, winding 90' is energized by a circuit from wire 77, terminal 2', winding 90', terminal 3', wire 87, solenoid contact 53, armature 52 and ground. It will be noted that the solenoids X3 and Y3 are energized at this time, since both relays RT and LT are deenergized. It will also be seen that this time the windings 91 and 91' of the right and left motors are shunted at this time respectively through the armature 46 and contact 47 of solenoid X4, and the armature 54 and contact 55 of solenoid Y4, the solenoids X4 and Y4 being energized by the engagement of armature 66 with contact 67 of relay RT and armature 72 with contact 73 of relay LT.

When transmitter 14 emits a carrier modulated by a tone suitable to energize the relay 56, the relay RT becomes energized by engagement of armature 60 with contact 59, whereby the armature 66 is elevated to engage the contact 68. This energizes solenoids X1 and X2 and deenergizes solenoids X3 and X4. Motor winding 91 becomes energized by a circuit including wire 77, wire 84, terminal 2, the winding 91, the terminal 1, wire 86, contact 41, armature 40 and the grounded wire 78. At the same time, the winding 90 is shunted by the engagement of armature 42 with contact 43. This reverses the direction of motor 20, thereby causing the right wheel 19 to reverse its direction, producing a right turn.

Similarly, when the transmitter emits a carrier whose modulation contains the tone required to energize the relay 58, the relay LT becomes energized, causing its armature 72 to engage its upper contact 74. This energizes the solenoids Y1 and Y2 and deenergizes solenoids Y3 and Y4, energizing the winding 91' of the left motor 20' and shunting the winding 90' thereof. The reversal of motor 20' causes the left wheel 19 to reverse its direction, causing the mechanical calf to execute a left turn.

To stop movement of the mechanical calf, it is merely necessary to transmit a carrier modulated by the tone required to energize the relay 57, which causes energization of relay ST, elevating armature 69 from contact 70. This disconnects the wire 77 from the battery wire 75, simultaneously deenergizing both motors 20 and 20'.

It will thus be seen that by suitably modulating the transmitter 14, the mechanical cutting calf may be made to execute various patterns of movement and to execute these patterns of movement as many times as required. As shown in FIGURE 1, the transmitter 14 may be provided with suitable control switches 97 to change its modulation tones at the will of the operator.

As shown in FIGURE 6, a suitable master switch 98 may be provided in the battery wire 75 between the positive terminal of the series-connected batteries 24, 25 and the connection of the wire 76 to wire 75, so that the mechanical cutting calf may be deenergized when it is not in use.

While a specific embodiment of an improved mechanical cutting calf for use in training horses has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A mechanical calf for use in training horses comprising a wheeled base provided with a pair of rear driving wheels and a freely vertically-pivoted front dolly-wheel assembly, a simulated calf body mounted on said base, respective motors drivingly coupled to said driving wheels, each motor having a forward winding and a reverse winding, means to energize the forward windings simultaneously, whereby to simultaneously drive the wheels forwardly in the same direction, and means to at times selectively energize the forward and reverse windings of the motors, whereby to selectively reverse the direction of operation of the motors, whereby to cause said wheeled base to execute right or left turns simulating the turning movements of a live calf.

2. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body including a plurality of relays selectively controlled by said radio receiver, respective electric motors drivingly coupled to said driving wheels, each motor having a forward winding and a reverse winding, means to energize the forward windings simultaneously whereby to simultaneously drive the wheels forwardly in the same direction, and means operating in response to the operation of said relays to at times selectively energize the forward and reverse windings of the motors, whereby to selectively reverse the direction of operation of the motors, whereby to cause said wheeled base to execute right or left turns simulating the turning movements of a live calf.

3. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body including a plurality of relays selectively controlled by said radio receiver, respective reversible electric motors drivingly coupled to said driving wheels, each motor having a forward winding and a reverse winding, a source of current mounted on said wheeled base, a plurality of solenoid switches mounted on said base, means connecting the windings of said motors respectively to said source of current through the contacts of said solenoid switches, certain of said solenoid switches being in circuit with the forward windings and the other solenoid switches being in circuit with the reverse windings, means to energize said certain of said solenoid switches to energize the forward windings simultaneously, means to energize said other of said solenoid switches to energize the reverse windings simultaneously, whereby to simultaneously drive the wheels in the same direction, and means controlled by said relays to selectively energize said solenoid switches to selectively energize the forward and reverse windings of the motors, whereby to selectively reverse the direction of operation of the motors, whereby to cause said wheeled base to execute right or left hand turns simulating the turning movements of a live calf.

4. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body including a plurality of relays selectively-controlled by said radio receiver, respective reversible electric motors drivingly coupled to said driving wheels, each motor having a forward winding and a reverse winding, a source of current mounted on said wheeled base, a plurality of normally open solenoid switches mounted on said base, means connecting the windings of said motors to said source of current through the contacts of said solenoid switches, certain of said solenoid switches being in circuit with the forward windings and the other solenoid switches being in circuit with the reverse windings, means to energize said certain of said solenoid switches to energize the forward windings simultaneously, means to energize said other of said solenoid switches to energize the reverse windings simultaneously, whereby to simultaneously drive the wheels in the same direction, means controlled by said relays to selectively energize said solenoid switches to selectively energize the forward and reverse windings of the motors, whereby to selectively reverse the direction of operation of the motors, whereby to cause said wheeled base to execute right or left turns simulating the turning movements of a live calf, and means controlled by one of said relays to maintain all of said solenoids deenergized, whereby to stop movement of said wheeled base.

5. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body, respective reversible electric motors drivingly coupled to said driving wheels, each motor having a forward winding and a reverse winding, a source of current mounted on said wheeled base, a plurality of normally open solenoid switches mounted on said base, means connecting the respective windings of said motor to said source of current through the contacts of said solenoid switches, certain of said solenoid switches being in circuit with the forward windings and other solenoid switches being in circuit with the reverse windings, a pair of double-throw relays selectively operated by said radio receiver, means energizing said certain of said solenoid switches in a manner to simultaneously drive the wheels in the same direction when neither of said relays is energized, means to energize the solenoid switch connected in circuit with one of the reverse windings and simultaneously deenergize the associated forward winding responsive to the energization of one of the relays, and means to energize the solenoid switch connected in circuit with the other reverse winding and simultaneously deenergize its associated forward winding responsive to the energization of the other of the relays, whereby to cause said wheeled base to execute right or left turns simulating the turning movements of a live calf.

6. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body, respective reversible electric motors drivingly coupled to said driving wheels, each motor having a forward winding and a reverse winding, a source of current mounted on said wheeled base, a plurality of normally open solenoid switches mounted on said base, means connecting the respective windings of said motors to said source of current through the contacts of said solenoid switches, certain of said solenoid switches being in circuit with the forward windings and other solenoid switches being in circuit with the reverse windings, a pair of double-throw relays selectively operated by said radio receiver, means energizing said certain of said solenoid switches in a manner to simultaneously drive the wheels in the same direction when neither of said relays is energized, means to energize the solenoid switch connected in circuit with one of the reverse windings and simultaneously deenergize the associated forward winding responsive to the energization of one of the relays, means to energize the solenoid switch connected in circuit with the other reverse winding and simultaneously deenergize its associated forward winding responsive to the energization of the other of the relays, whereby to cause said wheeled base to execute right or left turns simulating the turning movements of a live calf, a further relay controlled by said radio receiver, and means operating in response to the energization of said further relay to maintain all of said solenoid switches deenergized, whereby to stop movement of said wheeled base.

7. A mechanical calf for use in training horses comprising a wheeled base provided with a pair of rear driving wheels and a freely vertically-pivoted front dolly-wheel assembly, a simulated calf body mounted on said base, a control radio receiver mounted in said simulated calf body, respective reversible electric motors drivingly coupled to said driving wheels, each motor having a forward winding and a reverse winding, a source of current mounted on said wheeled base, a plurality of normally open solenoid switches mounted on said base, means connecting the respective windings of said motors to said source of current through the contacts of said solenoid switches, certain of said solenoid switches being in circuit with the forward windings and other solenoid switches being in circuit with the reverse windings, a pair of double-throw relays, means energizing said certain of said solenoid switches in a manner to simultaneously drive the wheels in the same direction when neither of said relays in energized, means to energize one of said relays responsive to the reception of a first predetermined control signal by said receiver, means to energize the solenoid switch connected in circuit with one of the reverse windings and simultaneously deenergize the associated forward winding in a manner to reverse the direction of one of the wheels responsive to the energization of said one relay, means to energize the other of said relays responsive to the reception of a second predetermined control signal by said radio receiver, and means to energize the solenoid switch connected in circuit with the other reverse winding and simultaneously deenergize its associated forward winding in a manner to reverse the direction of the other wheel responsive to the energization of said other relay, whereby to cause said wheeled base to execute right or left turn simulating the turning movements of a live calf.

8. A mechanical calf for use in training horses, comprising a wheeled base provided with a pair of rear driving wheels and a freely vertically-pivoted front dolly-wheel assembly, a simulated calf body mounted on said base, a control radio receiver mounted in said simulated calf body, respective reversible electric motors drivingly coupled to said driving wheels, each motor having a forward winding and a reverse winding, a source of current mounted on said wheeled base, a plurality of normally open solenoid switches mounted on said base, means connecting the respective windings of said motors to said source of current through the contacts of said solenoid switches, certain of said solenoid switches being in circuit with the forward windings and other solenoid switches being in circuit with the reverse windings, a pair of double-throw relays, means energizing said certain of said solenoid switches in a manner to simultaneously drive the wheels in the same direction when neither of said relays is energized, means to energize one of said relays responsive to the reception of a first predetermined control signal by said receiver, means to energize the solenoid switch connected in circuit with one of the reverse windings and simultaneously deenergize the associated forward winding in a manner to reverse the direction of one of the wheels responsive to the energization of said one relay, means to energize the other of said relays responsive to the reception of a second predetermined control signal by said radio receiver, means to energize the solenoid switch connected in circuit with the other reverse winding and simultaneously deenergize the associated forward winding in a manner to reverse the direction of the other wheel responsive to the energization of said other relay, whereby to cause said wheeled base to execute right or left turns simulating the turning movements of a live calf, a further relay, means to energize said further relay responsive to the reception of a third predetermined control signal by said radio receiver, and means operating in response to the energization of said further relay to maintain all of said solenoid switches deenergized, whereby to stop movement of said wheeled base.

9. The mechanical calf of claim 8, and wherein the means to deenergize said associated forward windings includes means to disconnect said last-named forward windings from said source.

10. The mechanical calf of claim 9, and wherein the means to deenergize said associated forward windings includes means to short-circuit the last-named forward windings simultaneously with the disconnection of said last-named forward windings from said source.

References Cited by the Examiner
UNITED STATES PATENTS

| | | | |
|---|---|---|---|
| 2,253,096 | 8/1941 | Sheldon | 280—1.195 |
| 2,832,426 | 4/1958 | Seargeant | 180—2 |
| 3,009,525 | 11/1961 | De Liban | 180—82 |
| 3,095,937 | 7/1963 | Vulliet-Dviand | 180—2 |
| 3,160,983 | 12/1964 | Smith et al. | 46—232 |

SAMUEL KOREN, *Primary Examiner.*

HUGH R. CHAMBLEE, *Examiner.*